Figure 1:
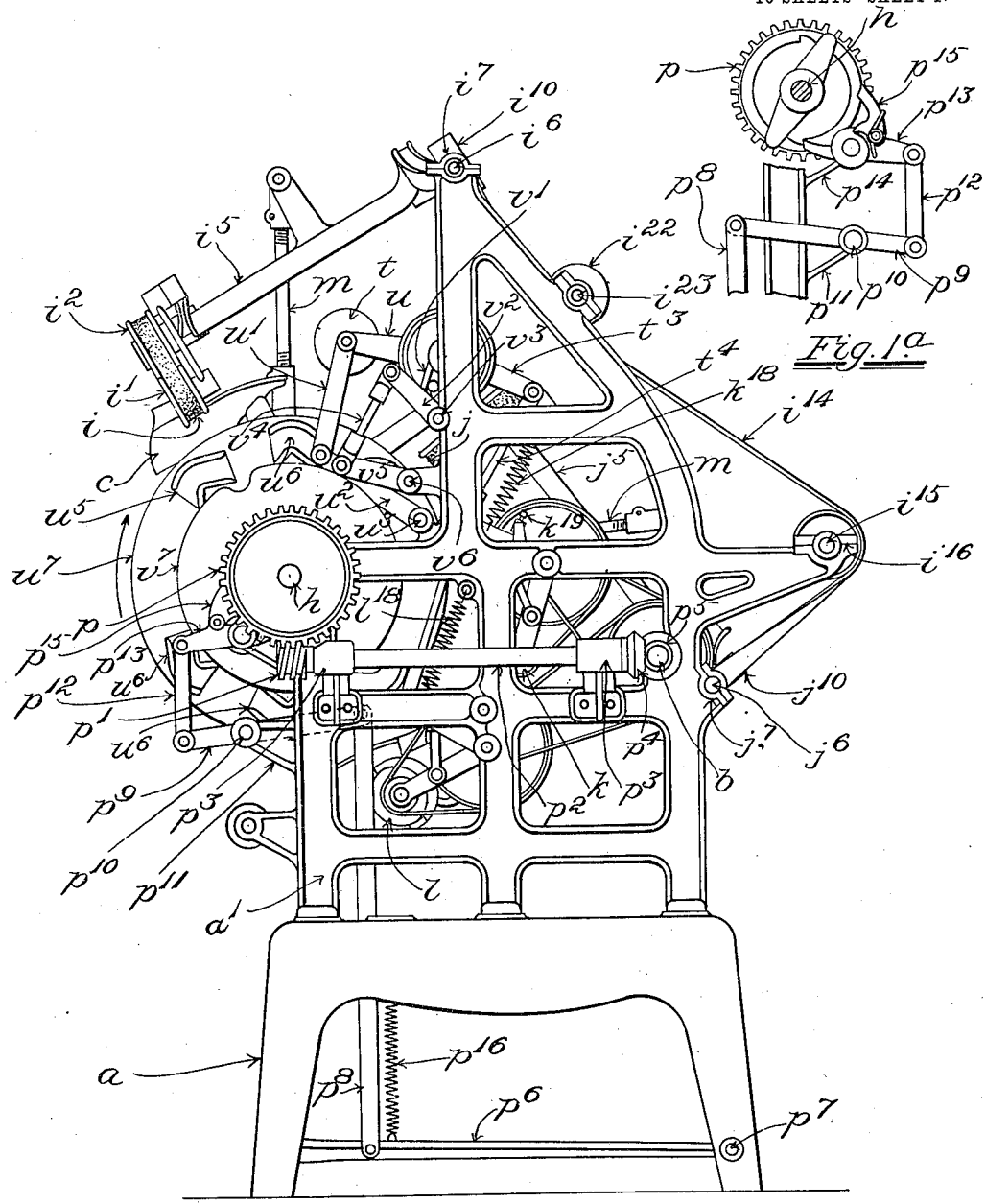

No. 825,712. PATENTED JULY 10, 1906.
W. C. EVANS & E. H. TAYLOR.
S. M. EVANS, ADMINISTRATRIX OF W. C. EVANS, DEC'D.
BOTTOM FINISHING MACHINE FOR SHOES.
APPLICATION FILED JAN. 27, 1905.

10 SHEETS—SHEET 2.

Witnesses:
Oscar F. Hill
Alice Tarr

Inventors
Warren C. Evans
Eugene H. Taylor
by Chas. F. Randall
Attorney.

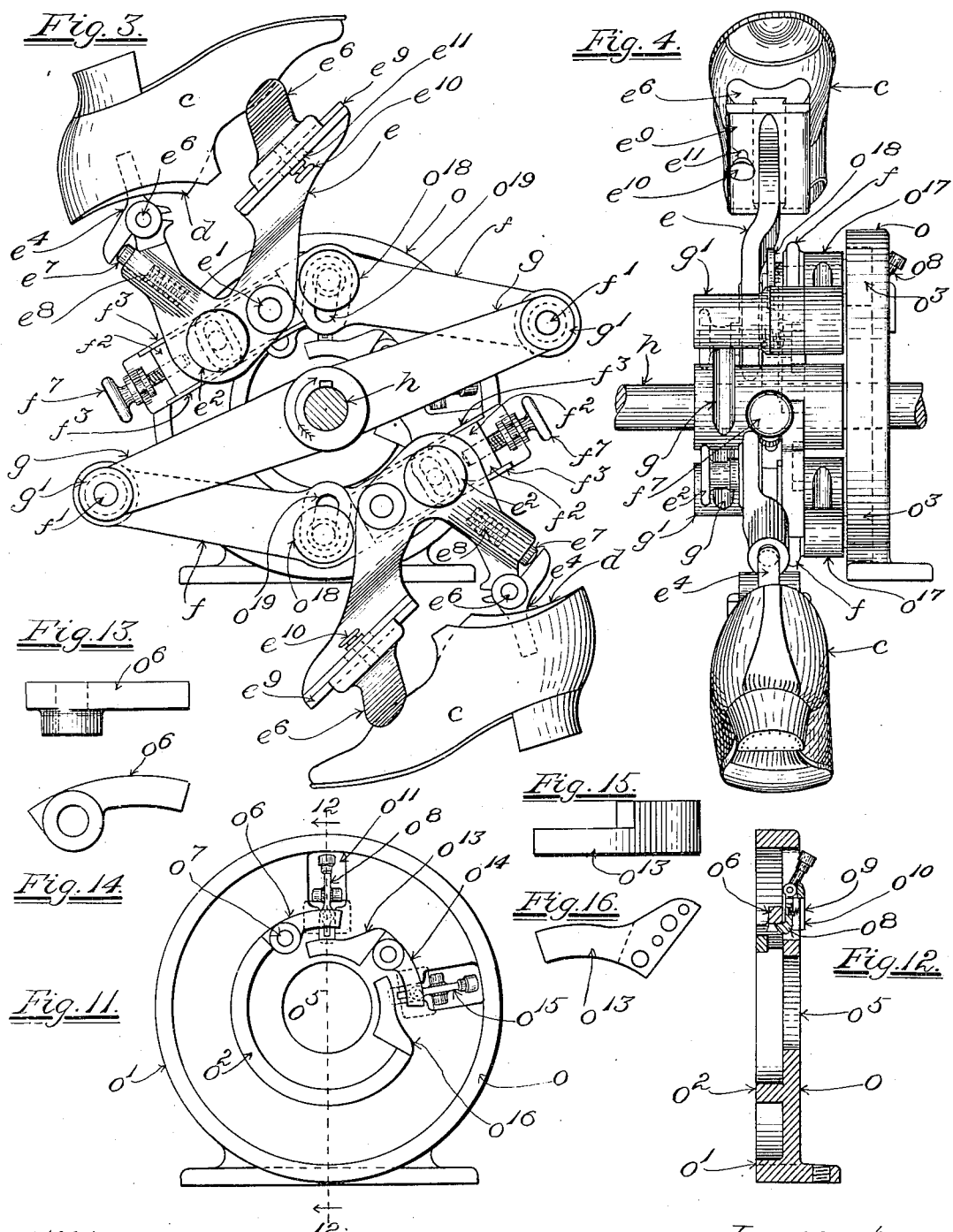

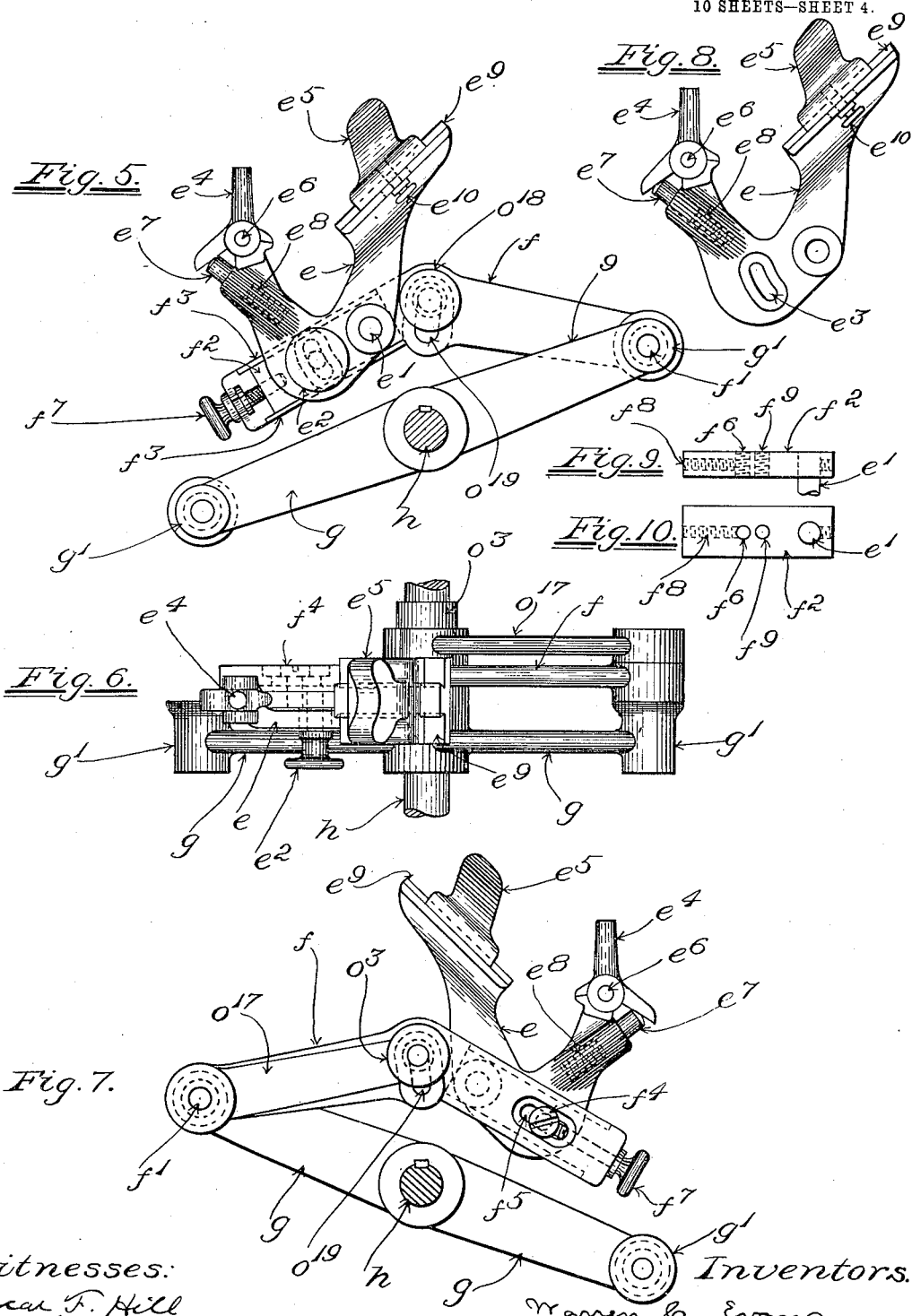

No. 825,712. PATENTED JULY 10, 1906.
W. C. EVANS & E. H. TAYLOR.
S. M. EVANS, ADMINISTRATRIX OF W. C. EVANS, DEC'D.
BOTTOM FINISHING MACHINE FOR SHOES.
APPLICATION FILED JAN. 27, 1905.

10 SHEETS—SHEET 5.

Witnesses:
Oscar F. Hill
Edith J. Anderson

Inventors:
Warren C. Evans
Eugene H. Taylor
by Chas. F. Randall
Attorney.

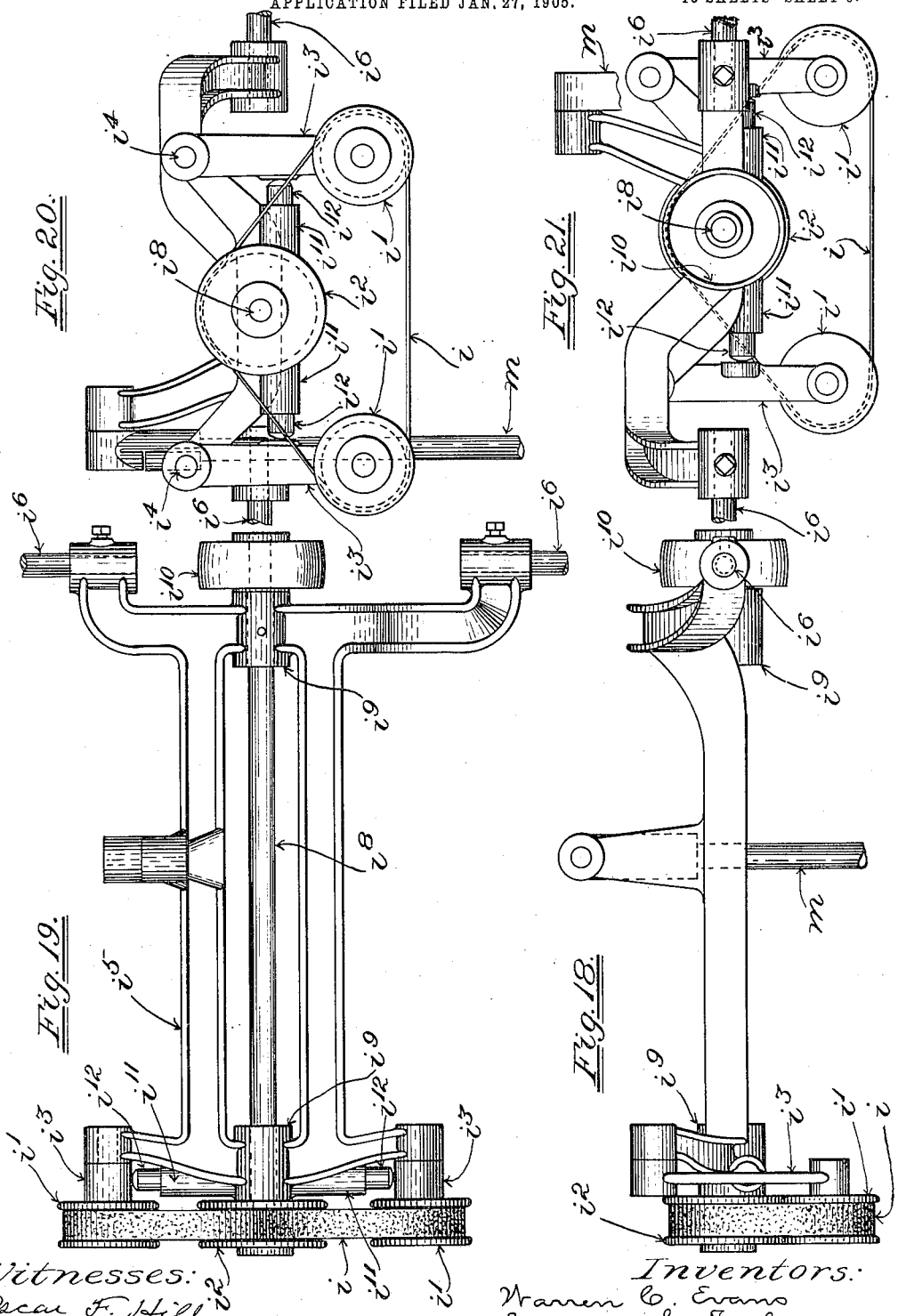

No. 825,712. PATENTED JULY 10, 1906.
W. C. EVANS & E. H. TAYLOR.
S. M. EVANS, ADMINISTRATRIX OF W. C. EVANS, DEC'D.
BOTTOM FINISHING MACHINE FOR SHOES.
APPLICATION FILED JAN. 27, 1905.
10 SHEETS—SHEET 7.
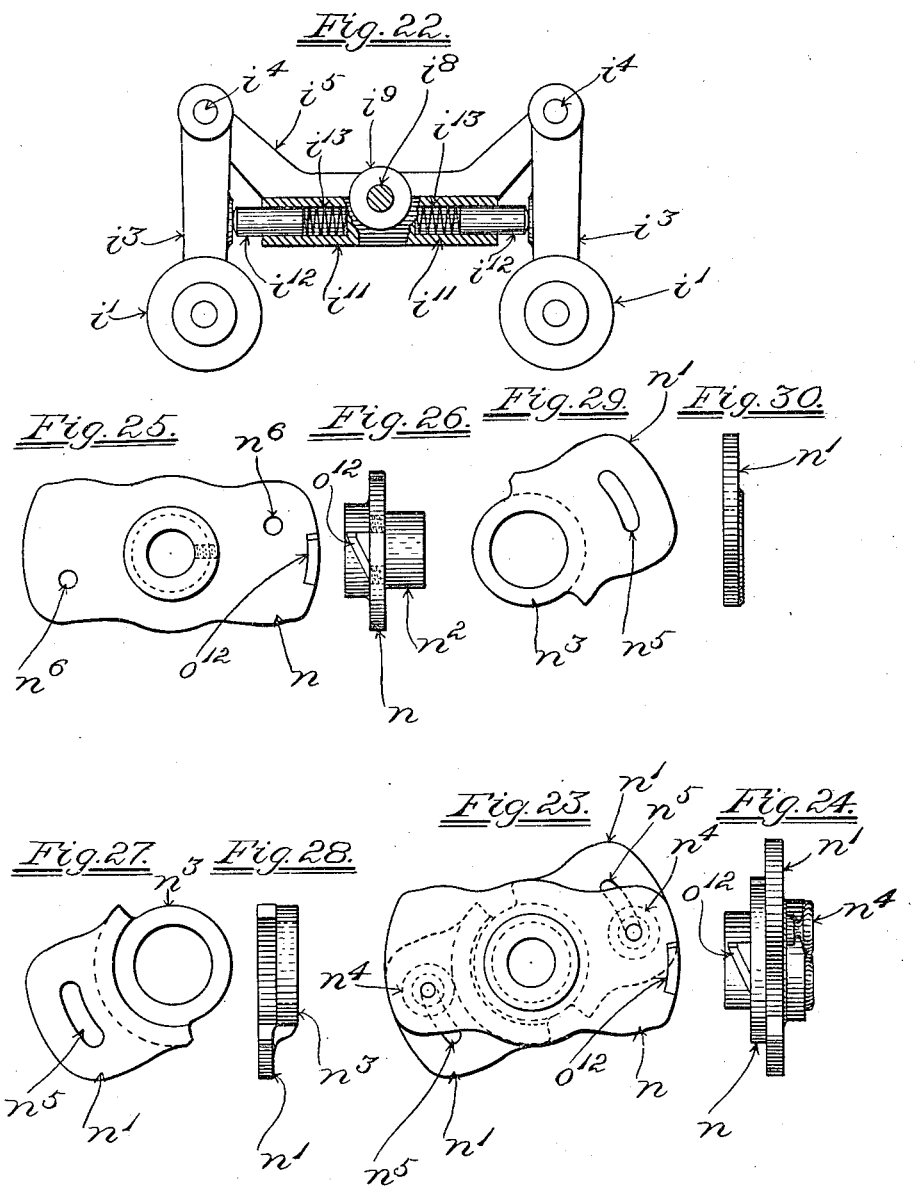
Witnesses:
Oscar F. Hill
Edith J. Anderson
Inventors:
Warren C. Evans
Eugene H. Taylor
by Chas. F. Randall
Attorney.

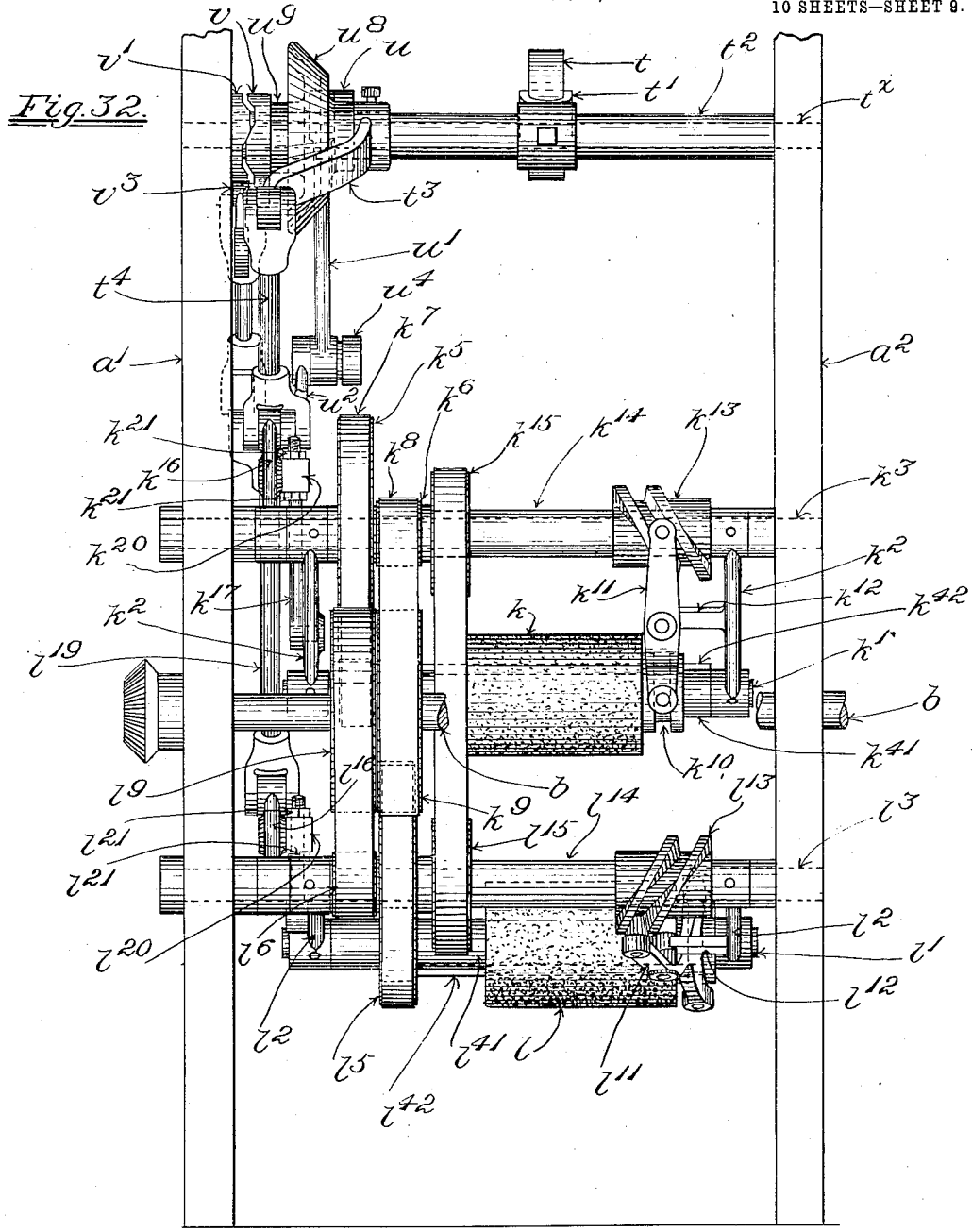

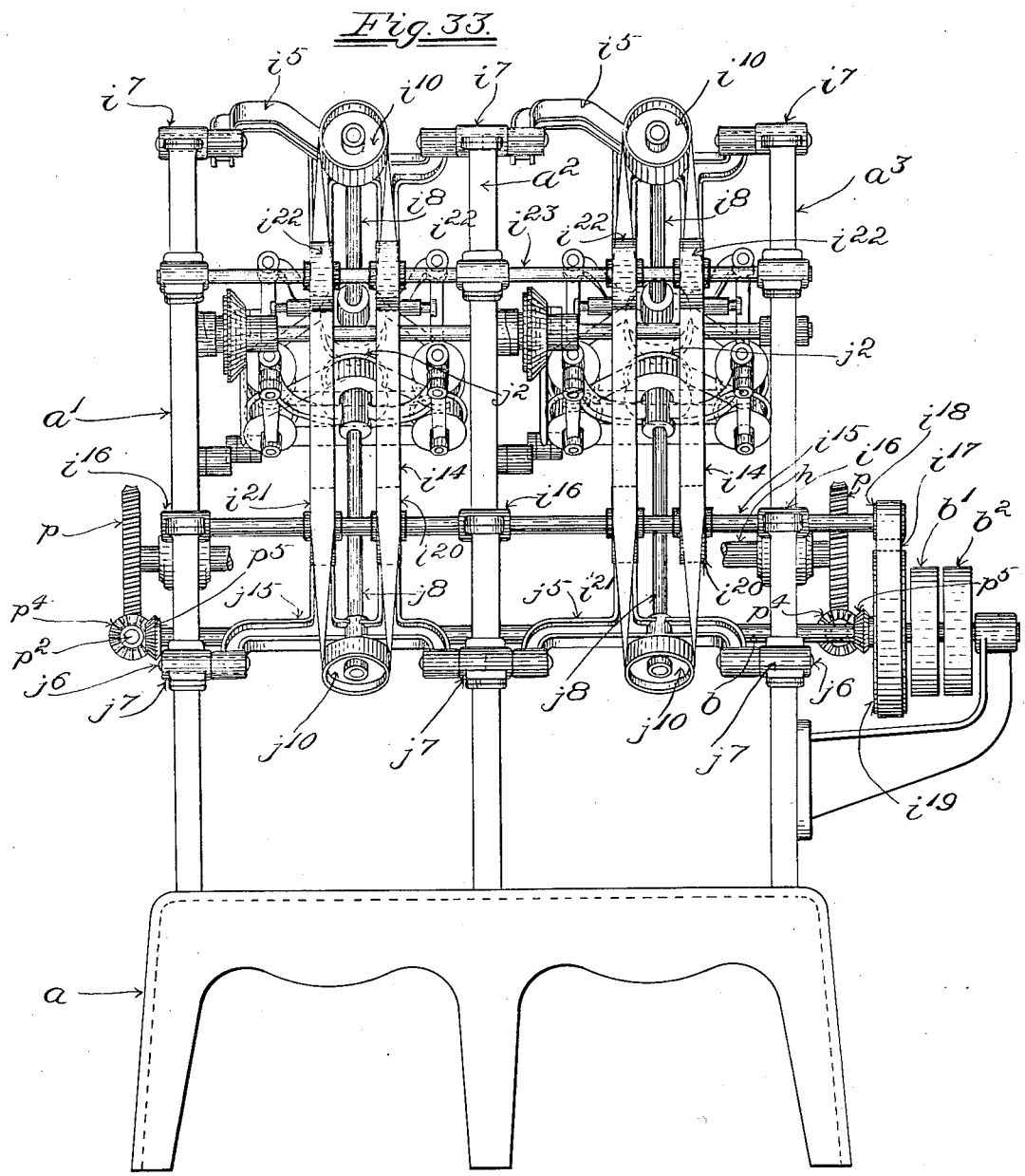

UNITED STATES PATENT OFFICE.

WARREN C. EVANS, OF EXETER, NEW HAMPSHIRE, AND EUGENE H. TAYLOR, OF LYNN, MASSACHUSETTS; SARAH M. EVANS ADMINISTRATRIX OF SAID WARREN C. EVANS, DECEASED.

BOTTOM-FINISHING MACHINE FOR SHOES.

No. 825,712.     Specification of Letters Patent.     Patented July 10, 1906.

Application filed January 27, 1905. Serial No. 242,834.

*To all whom it may concern:*

Be it known that we, WARREN C. EVANS, residing at Exeter, in the county of Rockingham, State of New Hampshire, and EUGENE H. TAYLOR, residing at Lynn, county of Essex, State of Massachusetts, citizens of the United States, have invented a certain new and useful Improvement in Bottom-Finishing Machines for Shoes, of which the following is a specification, reference being had therein to the accompanying drawings.

The invention consists in a machine for buffing or otherwise finishing the bottoms of the soles, shanks, and heels of boots and shoes automatically.

In a machine embodying the invention a shoe fitted to a form mounted upon a work-carrier is presented by the advancing movement of the latter to a series of buffing-surfaces. The machine is provided with one or more of such surfaces to act upon the bottom of the sole and shank of the said shoe and with one or more to act upon the wear-surface of the top lift of the heel thereof. Preferably it is equipped with a plurality of buffing-surfaces, as two, to act one after the other upon the sole and shank, such surfaces being of different degrees of fineness in order that one thereof may perform the rough preliminary buffing and the other thereof the finishing, and a plurality, as two, of heel-buffing surfaces, also differing in fineness, to act one after the other upon the said wear-surface of the top lift. Means is provided whereby after the rear portion of the shank has been presented to a buffing-surface for the sole and shank and acted upon thereby a relative shift is produced by which such buffing-surface and the heel of the shoe are caused to clear each other to enable the heel to pass the buffing-surface in the continuing movement of the work-carrier. This relative shift for purposes of clearance is caused to occur for each of the buffing-surfaces for the sole and shank. In buffing the shank the corresponding buffing-surfaces are caused to act thereon in close proximity to the breast of the heel. In order that while the relative shift is taking place the continued advancing movement of the work-carrier may be prevented from carrying the said breast against the buffing-surface which has just operated upon the sole and shank, we provide means by which, concurrently with the relative shift, the advancing movement of the shoe is interrupted by a dwell or suspension affording time for the heel and buffing-surface to clear each other. With the heel-buffing surfaces are combined a gage which acts to measure the height of the heel that is to be operated upon by the said surfaces and devices operating under the control of the said gage to set the said surfaces to suit the height of the heel before the heel arrives at such surfaces. Devices are provided by means of which as the heel passes a heel-buffing surface and the wear-surface of the top lift is acted upon by the latter a gradual shift of the said buffing-surface and wear-surface relative to each other is caused to take place in a manner to suit the outward inclination of the plane of the wear-surface of the heel. Thereby each heel-buffing surface is caused to conform to the said inclination of the said wear-surface, and excessive action upon the rear portion of the wear-surface and resulting injury to the heel are prevented.

An embodiment of the invention is illustrated in the accompanying drawings. The machine shown is essentially a double or twin machine, it being provided in practice with two rotary work-carriers, that are located side by side at the front of the machine, and with a corresponding duplication of the buffing-surfaces and other parts which act in conjunction with the two work-carriers. The main driving mechanism of the machine, however, is not duplicated. In order to avoid encumbering the drawings, we have in the main avoided the representation of merely duplicated parts.

Figure 2:
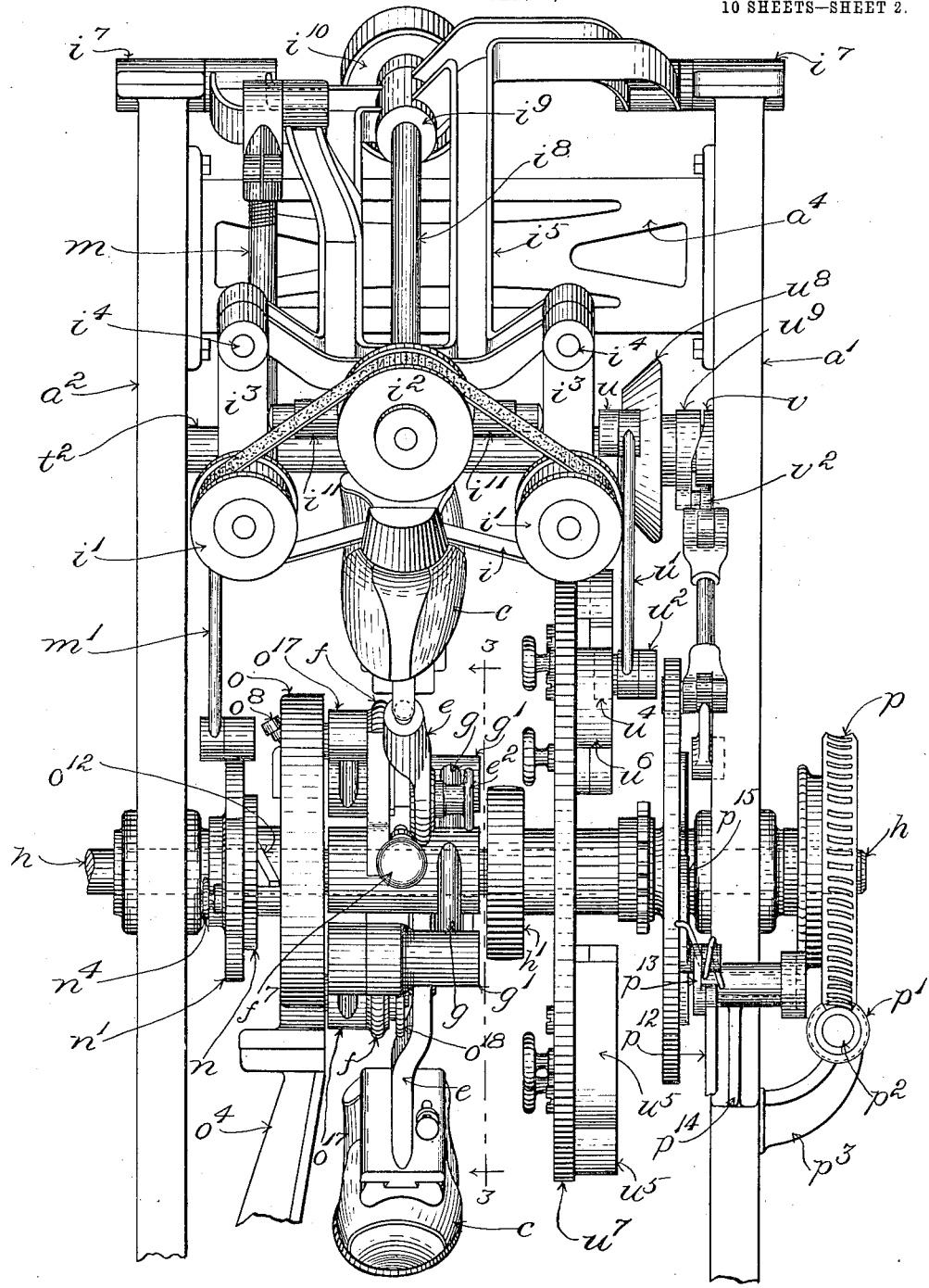
Figure 17:
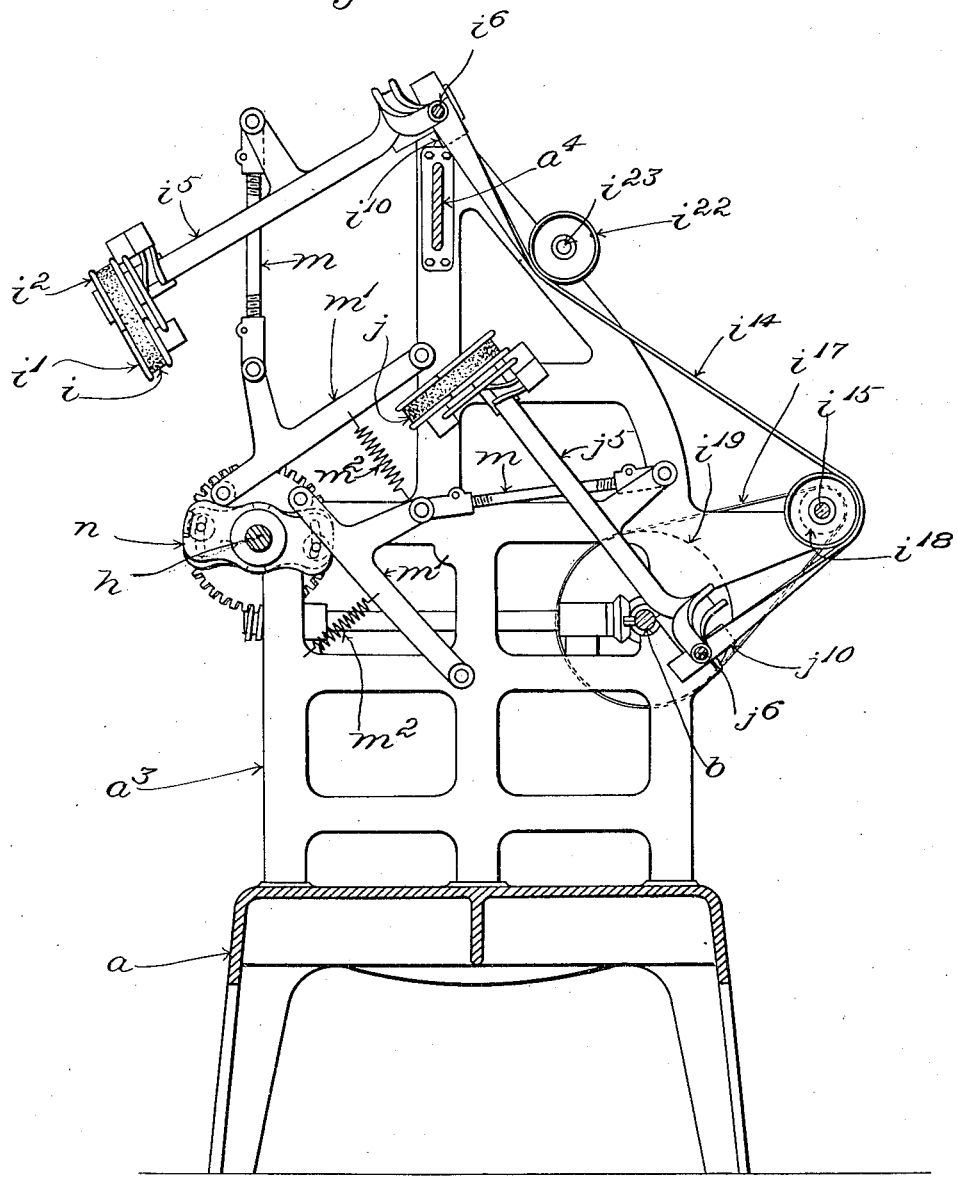
Figure 31:
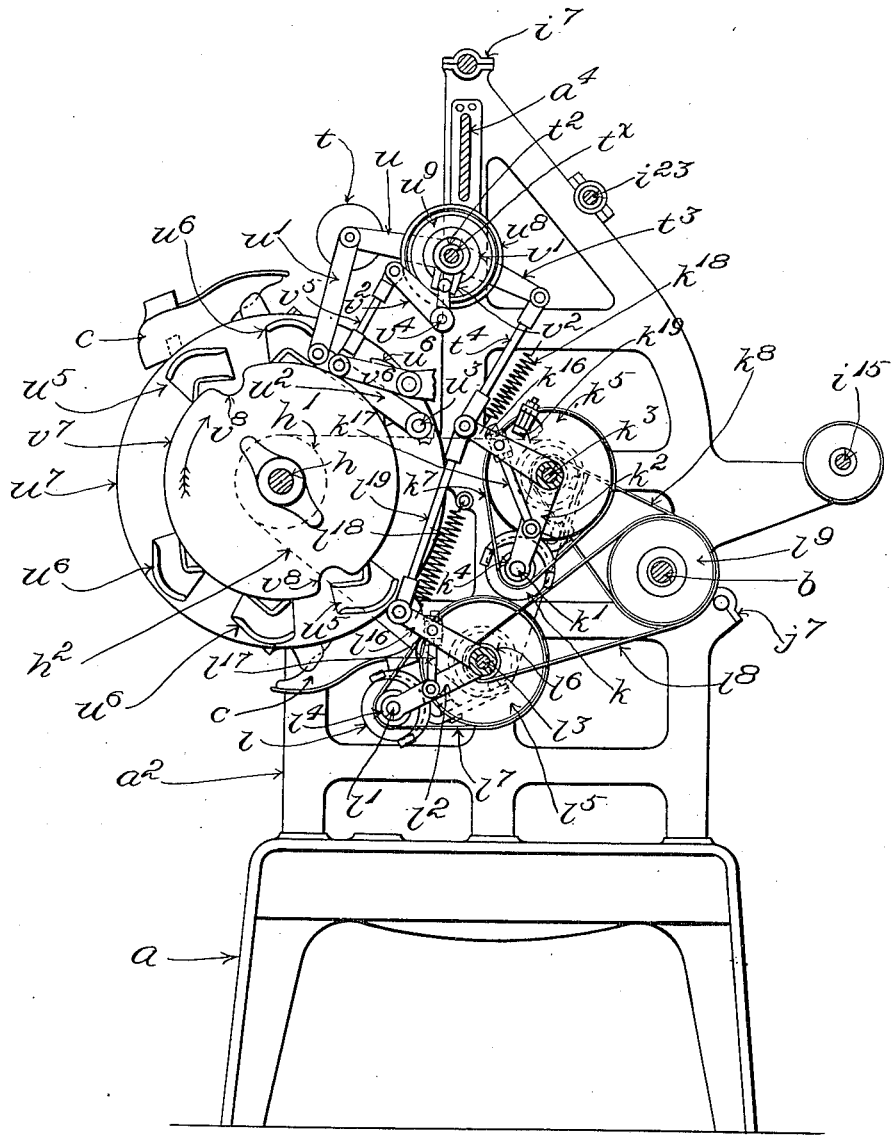

In the drawings, Figure 1 shows in end elevation the right-hand end of the said machine. Fig. 1ª, Sheet 1, is a detail view of the clutch devices for one of the work-carriers. Fig. 2, Sheet 2, is a view showing in front elevation, on an enlarged scale, a portion of the machine at the right-hand end thereof. Fig. 3, Sheet 3, is a view in section on the dotted line 3 3 of Fig. 2 looking in the direction indicated by the arrows at the ends of such line, showing, on a larger scale than Figs. 1 and 2, a work-carrier and the means for producing the inward and rearward movement of the shoe to obviate accidental engagement of the forward end or breast of the heel with the surfaces by which the sole and shank are buffed. Fig. 4, Sheet 3, is a view showing the parts of Fig. 3 in rear elevation. Fig. 5, Sheet 4, is a view showing separately the body of a work-carrrier, one of the jacks which are applied thereto, and the means of mounting the jack upon the said body. Fig. 6, Sheet 4, is a plan view of the parts which are shown in Fig. 5. Fig. 7, Sheet 4, is an elevation of the parts which are shown in Fig. 5 viewed from the side thereof opposite that which is viewed in Fig. 5. Fig. 8, Sheet 4, shows a jack in side elevation detached. Figs. 9 and 10, Sheet 4, are respectively top or edge and side views of the slide-block with which the jack of Fig. 8 is connected in the machine. Fig. 11, Sheet 3, shows in side elevation the guide which is employed in connection with a work-carrier. Fig. 12, Sheet 3, is a view in vertical section on the line 12 12 of Fig. 11 looking in the direction that is indicated by the arrows at the ends of such line. Figs. 13 and 14, Sheet 3, are respectively a plan view and a side elevation of one of the movable members of the said guide. Figs. 15 and 16 are respectively a plan view and a side elevation of the fixed portion of the said cam which is employed immediately following the movable member of Figs. 13 and 14. Fig. 17, Sheet 5, is a view on the same scale as Fig. 1 of the machine in vertical section on a plane extending from front to rear in the machine and showing chiefly the devices for buffing the sole and shank of a shoe. The devices which are shown in Fig. 17 are located in the left-hand half of the machine. Fig. 18, Sheet 6, shows in side elevation, on an enlarged scale, one of the buffing-frames of Fig. 17, it carrying a buffing-band for acting upon the sole and shank of a shoe. Fig. 19, Sheet 6, is a plan view of the buffing-band frame shown in Fig. 18. Figs. 20 and 21, Sheet 6, are respectively front and rear end elevations of the buffing-band frame shown in Figs. 18 and 19. Fig. 22, Sheet 7, is a detail view, partly in section, showing chiefly the devices for maintaining the buffing-band of the frame shown in Figs. 18 to 21 in a proper state of tension. Figs. 23 and 24, Sheet 7, are respectively a side elevation and an edge view of the adjustable cam by which the position of the buffing-band frames is controlled and by which such frames are operated to withdraw the buffing-bands from the path of movement of the heel of a shoe supported upon the work-carrier. Figs. 25 to 30, Sheet 7, are views showing the details of the adjustable cam that is represented in Figs. 23 and 24. Fig. 31, Sheet 8, is a view on the same scale as Figs. 1 and 17 of the machine in section on a vertical plane in the right-hand half of the machine extending from front to rear and showing chiefly the parts which are involved in buffing the heel of a shoe. Fig. 32, Sheet 9, shows in rear elevation, on an enlarged scale, certain of the parts of Fig. 31. Fig. 33, Sheet 10, is a rear view of certain portions of the machine, intended to indicate chiefly the twin construction of the machine and to show some of the driving arrangements.

Having reference to the drawings, the machine-framing comprises chiefly the base or stand $a$, the opposite upright side pieces or end pieces $a'$ $a^3$, (the side piece $a^3$ being shown best in Fig. 17 of Sheet 5 and Fig. 33 of Sheet 10,) supported by the said base or stand, the upright intermediate frame-piece $a^2$, Fig. 2 and Figs. 32 and 33, Sheets 9 and 10, which also is supported by the said base and girths, one of which is shown at $a^4$, Fig. 2 and Figs. 17 and 31 of Sheets 5 and 8. The power or driving shaft is shown at $b$, Fig. 1 and Figs. 17, 31, 32, and 33, it being mounted in suitable bearings at the rear in the machine in the upright portions of the framing. In Fig. 33 the said shaft is shown furnished with fast and loose band-pulleys $b'$ $b^2$ for the reception of a driving-belt, (not shown,) a suitable belt-shipper (also not shown) being provided in practice for throwing the power on and off, or other approved driving and power-shipping devices may be employed, as preferred.

A shoe $c$, that is to be operated upon, is placed upon a form $d$, Fig. 3 of Sheet 3, the combined form and shoe being applied to a jack $e$, Figs. 2, 3, and 4, forming part of a work-carrier which is mounted upon a work-carrier shaft $h$. As thus applied, the bottom of the shoe is turned outward, and thus exposed to the action of the buffing-surfaces which are arranged around the work-carrier. By rotary movement communicated to the work-carrier the shoe $c$ is presented to one after the other of the successive buffing-surfaces, so as to be operated upon by the latter in turn. The buffing-surfaces comprise a coarse buffing-band $i$, (shown in place in the machine in Figs. 1, 2, &c., and also shown in the detail views, Figs. 18 to 21, Sheet 6,) a fine buffing-band $j$, corresponding in general character with buffing-band $i$, these two operating upon the sole or, preferably, sole and shank of the shoe as it is presented to them in turn, and the coarse buffing roll or cylinder $k$ and fine buffing roll or cylinder $l$, (shown in Figs. 1, 31, and 32,) these rolls or cylinders operating upon the wear-surface of the top lift of the heel of the shoe as the said wear-surface is presented to them in turn.

For the support of a form and the shoe which has been applied thereto the jack $e$ is furnished with a pin $e^4$ to enter a hole in the top of the rear part of the form, and with a rest $e^5$, against which lies the fore part of the said shoe. In order to enable the fore part of the form and shoe to be pressed toward the said rest and the pin $e^4$ to be cramped within the hole in the rear part of the form, so as to prevent the latter from slipping off the pin, the pin is connected with the rear portion of the jack by means of a pivot $e^6$, and a projecting tail portion of the pin is pressed against by a plunger or pin $e^7$, occupying a socket in said rear portion of the jack and pressed outwardly by an expanding spiral spring $e^8$, that is compressed between the plunger and the inner end of the socket. To suit different lengths of shoes, the fore-part rest $e^5$ is mounted upon a dovetailed way upon an inclined portion $e^9$ of the front portion of the jack and is adjustable along such inclined portion, a clamping-screw $e^{10}$ serving to secure it in its position of adjustment. The stem of the said clamping-screw passes through a slot $e^{11}$ in the portion $e^9$ into a threaded hole that is tapped in the base of the rest $e^5$, the head of the clamping-screw taking a bearing against the under side of the portion $e^9$.

Referring more particularly to the work-carriers and to the features thereof, which are represented in Figs. 2 to 10, Sheets 2, 3, and 4, each work-carrier is provided with a plurality of jacks. The drawings show two jacks to each work-carrier, which are located diametrically opposite each other. By the employment of a work-carrier having two or more jacks the output of the machine is increased, inasmuch as two or more shoes may be operated upon at the same time. The body portion $g$ of each work-carrier extends in opposite directions radially from the hub or sleeve thereof, which fits upon the work-carrier shaft $h$. Each of the outwardly-extending portions of the work-carrier body has applied thereto a jack-support $f$.

For the purposes of the relative shift by which the heel and the respective buffing-surfaces for the sole and shank are enabled to clear each other each jack-support is movably mounted upon the said body portion. To this end each jack-support is made in the form of an arm and is hung to the corresponding portion of the body portion by means of a pivot-pin or journal $f'$, Figs. 3, 5, and 7, with which the arm is furnished, and a bearing $g'$, with which the said body portion is formed and into which the said pivot-pin or journal is fitted. The pivot-pins or journals of the arms $ff$ of the two jacks pertaining to a work-carrier are located at opposite sides of the axis of rotation of the work-carrier. The free extremity of each arm $f$ and the jack which is attached to the said arm are movable toward and from the said axis. The relative shift aforesaid is effected by movement of the arm and jack inward from the outer or normal position thereof, occurring after the rear end of the shank of the shoe has been properly acted upon by a given buffing-band and coöperating in the present instance with outward movement, which at the same time is communicated to the buffing-band frame carrying the said buffing-band. As hereinbefore indicated, the relative shift of the shoe and the said buffing-band with respect to each other in a radial direction enables the heel to pass the buffing-band in the further rotation of the work-carrier. The clearance might be secured by radial movement of either the jack or the buffing-band frame alone; but by causing the two to move simultaneously in opposite directions an easy and quick separation is advantageously secured with less range of movement of individual parts, less speed and an easier action, and less wear and tear than would be the case if the clearance should be provided for by movement of one of the parts only.

The dwell or suspension in the advancing movement of the shoe, by which the breast of the heel is prevented from being carried against the buffing-surface while the relative shift is taking place, is provided for by locating the point of pivotal support of the arm $f$ in the lead of the jack in order that when the arm swings inwardly from the outer or normal working position the movement of the jack and the shoe thereon shall take place along a rearwardly-extending curved path. Movement inward along the said path, carrying the jack and shoe slightly toward the rear, offsets the effect of the continued forward rotation of the work-carrier and produces the desired brief suspension or dwell in the advance of the jack and shoe or decrease in the rate of such advance.

During the rotation of the work-carrier each arm thereof is controlled in such manner as to enable the shoe that is carried thereon to be supported firmly in proper position while being acted upon by the respective buffing-surfaces. This control is effected by means of the fixed guide $o$, Figs. 2, 3, 4, 11, and 12. The body of the guide $o$ is formed as a plate, which is fixed in a vertical position upon the stationary stand $o^4$, Fig. 2, the said plate having a central opening $o^5$, Figs. 11 and 12, through which the work-carrier shaft $h$ passes. As the work-carrier rotates a roll $o^3$, which is provided in connection with each arm $f$, travels around within the pathway of the guide. The guide is formed with fixed outer and inner walls or flanges $o'$ $o^2$, concentric with the work-carrier shaft $h$ and extending around the lower portion of the guide and up at the front thereof. While the roll $o^3$ of an arm $f$ is confined between the said fixed walls or flanges the arm $f$ with which such roll is connected and the jack and shoe carried by the said arm are caused to remain at a uniform distance from the center of the said shaft $h$. When the work-carrier stands at rest, one of the jacks is presented at the front of the machine, in position to enable the workman to remove a form carrying a shoe which has been operated upon and apply a form carrying a shoe requiring to be buffed. At such time the roll $o^3$ of the arm $f$ supporting such jack occupies a position between the concentric walls, and thus the jack is sustained while the operations of removing the one jack and shoe and applying the other jack and shoe are being performed. In order to provide for quick inward movement of the jack and the shoe carried thereby as soon as by the regular advance of the work-carrier, the rear portion of the shank of the shoe has been submitted to the action of the first buffing-band $i$, and before the breast of the heel has encountered the said buffing-band a hinged continuation $o^6$ of the inner wall or flange $o^2$ is employed. The said hinged continuation is constituted by a curved piece or member (shown in place in Figs. 11 and 12 of Sheet 3 and detached in Figs. 13 and 14 of said sheet) that is mounted upon the fixed plate $o$ by means of a pivot $o^7$, Fig. 11, with which is engaged the end of the said piece or member that is next adjacent the proximate end of the inner wall or flange $o^2$. Normally the piece or member $o^6$ is held in its outer or working position by means of a hooked latch $o^8$, which engages therewith, the hook of the latch being held in engagement with the piece or member $o^6$ through the action of an expanding spiral spring $o^9$, Fig. 12, that is compressed between the latch and an adjacent fixed strip $o^{10}$ upon the plate $o$. As the shoe travels under the buffing-band $i$ and the sole and shank are acted upon thereby the roll $o^3$ passes along the inner wall $o^2$ and from the upper end thereof onto the piece or member $o^6$, which at that time is held in place by latch $o^8$, so as to support the arm $f$ and jack. On the arrival of the forward end or breast of the heel in close proximity to the buffing-band the latch $o^8$ is tripped, so as to release the piece or member $o^6$, thereby rendering the part $o^6$ free to give way under the pressure of the roll $o^3$ thereagainst. This permits the arm $f$ to swing suddenly inward toward the center of the work-carrier. In order to enable the tripping of the latch $o^8$ to be effected at the proper time, the said latch is furnished with a tailpiece extending through an opening $o^{11}$ in the fixed plate into the path of a cam projection $o^{12}$, Fig. 2 of Sheet 2 and Figs. 23 and 25 of Sheet 7, which is carried by a suitable support upon and rotating with the work-carrier shaft $h$. For convenience the fixed member $n$ of the adjustable controlling-cam for the carrier-frames of the buffing-bands is utilized as such support. In order to render the action of the cam-piece $o^{12}$ upon the tail of the latch $o^8$ easy, the said tail is furnished with an antifriction-roll to receive the pressure of the cam-piece. The buffing-band $i$ and breast of the heel of the shoe having been caused to clear each other by the movement of the jack and shoe inward toward the center of the work-carrier and the simultaneous outward movement of the buffing-band, the continued advance of the work-carrier causes the roll $o^3$ to travel upon the fixed elevating cam-piece $o^{13}$, Figs. 11, 15, and 16 of Sheet 3, by which the arm $f$ is moved outward again to its previous position, thereby placing the shoe in position to have the sole and shank thereof acted upon by the second buffing-band $j$ in passing the latter. From the fixed elevating cam-piece $o^{13}$ the roll $o^3$ passes onto a second movable piece or member $o^{14}$, resembling the movable piece or member $o^6$, and provided with a latch $o^{15}$, corresponding with latch $o^8$. This latch $o^{15}$ holds the movable piece or member $o^6$ while the sole and shank of the shoe are being operated upon by the second buffing-band $j$ and then in turn is tripped by the cam projection $o^{12}$ to release the movable piece or member $o^{14}$, so as to allow arm $f$ to again swing inward, as soon as the rear portion of the shank of the shoe has been acted upon by the buffing-band $j$ to cause the front end or breast of the heel of the shoe to clear the second buffing-band $j$. A second fixed elevating cam-piece $o^{16}$ moves the arm $f$ outward again to place the shoe in position to have the wear-surface of its heel operated upon by the heel-buffing surfaces $k$ $l$. After passing from the fixed cam-piece $o^{16}$ the roll $o^3$ enters between the inner wall or flange $o^2$ and outer wall or flange $o'$ and is confined so as to support the arm $f$ at a uniform distance from the center of the work-carrier as the shoe is carried past the heel-buffing surfaces and acted upon thereby.

Shoes of different thickness in the fore parts thereof require radial adjustment of the jack upon the work-carrier to be effected in order that the bottoms of the soles, shanks, and heels of such shoes when mounted upon the jack may be located at a predetermined distance from the center, and thus be presented properly to the action of the buffing-surfaces. In order to provide for this adjustment, we provide means for effecting a radial adjustment of arm $f$ upon the work-carrier. To this end we mount the roll $o^3$ upon an arm $o^{17}$, Figs. 3, 4, 6, and 7, alongside the arm $f$. The arm $o^{17}$ is controlled by the guide $o$ through the engagement of the roll $o^3$ with such guide. It is supported by one end thereof upon the pivot $f'$, carried by the body portion $g$, upon which the arm $f$ is mounted. The arms $f$ and $o^{17}$ are clamped together by means of a screw $o^{18}$, Figs. 3, 4, and 5, the stem of which passes through a slot $o^{19}$ in the arm $f$ and enters a threaded hole that is tapped in the arm $o^{17}$. The slot $o^{19}$ is concentric with the pivot $f'$ and enables the arm $f$ to be adjusted radially with relation to arm $o^{17}$. On tightening up this screw $o^{18}$ the arms $f$ and $o^{17}$ are secured together, with the arm $f$ in the position relative to the arm $o^{17}$, into which it has been adjusted.

In order to enable the jack and the shoe thereon to be adjusted in the direction of the length thereof upon the work-carrier, so as to locate the breast of the heel of such shoe at the proper point to enable the shank of such shoe to be buffed close to the said breast without leaving a portion of the shank unbuffed and without engagement of the front end or breast of the heel with the buffing-band, the jack is mounted upon the arm $f$ with capacity for adjustment toward and from the pivot $f'$. Thus the jack $e$ is attached to a block $f^2$. (Shown separately in Figs. 9 and 10 of Sheet 4.) The said block is fitted between upper and lower guideways $f^3$ $f^3$ upon the arm $f$, extending lengthwise of the latter. The block is held to the arm by means of a screw $f^4$, Fig. 7, the stem of which passes transversely through a slot $f^5$ in the arm $f$, extending lengthwise of the latter, and enters a threaded hole $f^6$, Figs. 9 and 10, that is tapped in the block. The slot $f^5$ permits adjustment of the block and jack longitudinally of the arm to be effected by sliding the block along the said guideways $f^3$ $f^3$. To enable the adjustment to be accomplished conveniently and with certainty, an adjusting-screw $f^7$ is provided. This adjusting-screw is formed with collars receiving between them fixed lugs or projections extending from the outer end of arm $f$, as shown, whereby the adjusting-screw is held from longitudinal movement, while the threaded stem of the same enters a threaded hole $f^8$, Figs. 9 and 10, that is tapped into one end of the block. This adjustment provides for variations in the position of the breast of the heel of a shoe with respect to the length of the shoe.

For the purpose of enabling the jack to be adjusted, so that the longitudinal curve of the outer surface of the sole of a shoe carried by a form upon said jack shall be as nearly as possible concentric with the axis of rotation of the work-carrier, the jack is pivotally mounted at $e'$ upon the block $f^2$ and is provided with means to enable it to be adjusted around the pivot. The closer the approach to concentricity the more nearly uniform will be the tension of the buffing-band when operating upon the different portions of the length of the sole and shank. In order to hold the jack secured in the desired position of angular adjustment relative to its pivot, it is provided with a clamping-screw $e^2$, the stem of which passes through a segmental slot $e^3$, Fig. 8, in the jack, that is concentric with the pivot at $e'$ and enters a threaded hole $f^9$, Figs. 9 and 10, which is tapped in block $f^2$. On tightening up said clamping-screw the body of the jack becomes pinched between the block $f^2$ and an enlargement or collar upon the screw and is thereby held. Should the angular adjustment of the jack relative to pivot $e'$ displace the breast of the heel, a compensating shift of block $f^2$ may be effected by means of the adjusting-screw $f^7$ until the rear end of the shank stands in the same radial line with the pivot $e'$. (See Fig. 3.)

For the purpose of enabling the work-carriers to be rotated means is provided for transmitting movement to the same from the driving-shaft $b$. The motion-transmitting connections may vary more or less in construction and arrangement. In the present instance the respective work-carriers are separately driven, and the motion-transmitting connections for each work-carrier comprise a worm-gear $p$, Figs. 1, 1ª, and 2, which is mounted upon the shaft $h$ of such work-carrier, a worm $p'$, Figs. 1 and 2, in engagement with the said worm-gear, a worm-shaft $p^2$, mounted in bearings $p^3$ $p^3$ upon the corresponding side frame of the machine and extending in the direction from front to rear in the machine, a miter-gear $p^4$, fixed upon the rear end of the worm-shaft, (see also Fig. 33,) and a miter-gear $p^5$, fast upon the driving-shaft $b$. We provide clutch devices by means of which to control the actuation of the work-carrier through the connections described. The clutch in the present instance serves to enable the worm-gear $p$, which is loose upon the work-carrier shaft $h$, to be connected with the said shaft, so that the work-carrier and worm-gear shall rotate in unison or to be disconnected from the shaft $h$, so as to discontinue the transmission of driving power to the work-carrier. The character and mode of operation of the clutch devices may be varied in practice. The said clutch devices may be arranged to operate the work-carrier continuously after the clutch has been closed by the workman until the clutch is unshipped again by him. Preferably, however, they are of the well-known start-and-stop type and operate when brought into action to communicate one-half rotation to the work-carrier and then automatically disconnect the driving power from the latter. We have shown start-and-stop devices in the present instance. Devices of this character being well known and in common use in the arts, we have simply indicated in Figs. 1, 1ª, and 2 the relations of the clutch to the worm-gear and the clutch-actuating devices and have omitted minor details of construction. To enable the actuation of each work-carrier to be controlled manually, we provide a treadle $p^6$, Fig. 1, which is pivoted at its rear end, as at $p^7$, to the stand $a$. To the said treadle is connected the lower extremity of a rod or link $p^8$, having the upper extremity thereof connected to a lever $p^9$, which is pivoted at $p^{10}$ to a small stand $p^{11}$, projecting forward from the corresponding side frame of the machine and having its forward extremity connected by a rod or link $p^{12}$ to the actuating-arm $p^{13}$ of the clutch, the said actuating-arm being pivoted upon a small stand $p^{14}$, Fig. 1ª, that is also carried by the said side frame. When the treadle is depressed, it acts, through the parts just referred to, to move the clutch-actuating arm $p^{13}$ to start the clutch into action. The usual trip by which the clutch is tripped out of action at the end of a half-rotation is shown at $p^{15}$. By means of a contracting spiral spring $p^{16}$, having one extremity thereof joined to the treadle $p^6$ and the other extremity thereof connected to a fixed part of the stand $a$, the treadle is raised when the pressure of the workman's foot is relieved. The tripping devices are set to act to cause the work-carrier to stop at the end of every half-revolution thereof, with one jack presented at the front of the machine in advance of the first buffing-band $i$ in position to render convenient the removal from such jack of the shoe which has been buffed, together with its form, and the application to the said jack of another form carrying a shoe to be operated upon.

The means and manner of supporting and operating the buffing-bands $i$ and $j$ are shown more particularly in Figs. 1 and 2, Fig. 17 of Sheet 5, and Figs. 18 to 22 of Sheets 6 and 7. The construction and mode of operation in the case of both of the said buffing-bands are similar, and a description applying to one case will answer for both. Having reference now to the figures mentioned, the buffing-band $i$ is mounted upon opposite guide and tension pulleys $i'$ $i'$ and an intermediately-located driver-pulley $i^2$. The pulleys $i'$ $i'$ are mounted pivotally upon the lower ends of arms $i^3$ $i^3$, which are hung upon pivots $i^4$ $i^4$ at the forward end of a carrier-frame $i^5$, the latter being mounted upon the machine-frame by means of journals $i^6$ $i^6$ at its rear end fitting the bearings $i^7$ $i^7$, with which the machine-frame is provided. The pulley $i^2$ is fast upon the forward end of a shaft $i^8$, which latter is journaled in bearings $i^9$ $i^9$, with which the said carrier-frame is furnished. For the purpose of driving the shaft $i^8$ the latter is provided with a band-pulley $i^{10}$, which is mounted on the rear end thereof and receives a driving-band, as hereinafter explained. In operation the acting-surface of the portion of the buffing-band $i$ which extends across between the pulleys $i'$ $i'$ is caused to bear against the bottom of the sole and shank of a shoe which is being operated upon for the purpose of buffing the said bottom. For the purpose of holding the said buffing-band in a state of proper tension and of allowing the same to give or yield to conform to the different circles of the sole and shank of a shoe the arms $i^3$ $i^3$ are acted upon by spring-pressure, tending to move the same and the pulleys $i'$ $i'$ in opposite directions, and thus extend the buffing-band with yielding force. Thus, as shown best in Fig. 22, the forward end of the buffing-band frame $i^5$ is formed or provided with sockets $i^{11}$ $i^{11}$, receiving plungers $i^{12}$ $i^{12}$, which project partly from the said sockets and bear by their outer ends against the arms $i^3$ $i^3$. Between the inner ends of the said plungers and the inner ends of the said sockets are located expanding spiral springs $i^{13}$ $i^{13}$, which act through the plungers upon the arms $i^3$ $i^3$ with a tendency to move the arms away from each other. The carrier-frame for the buffing-band $j$ is designated $j^5$, Figs. 1, 17, and 33, it being mounted by journals $j^6$, Figs. 1, 17, and 33, in bearings $j^7$ $j^7$, Figs. 1 and 33, at the rear of the machine-frame. The operating-shaft of the buffing-band $j$ is designated $j^8$, Fig. 33, the power-receiving band-pulley fixed upon the rear end of the said shaft being designated $j^{10}$, Figs. 1, 17, and 33, and the driver-pulley fixed upon the forward end thereof for the actuation of buffing-band $j$ being designated $j^2$. The actuating-shafts $i^8$ $j^8$ for the buffing-bands $i$ $j$ of each section or half of the machine are operated by means of a single driving-band $i^{14}$, Figs. 1, 17, and 33, which in the upper portion of its circuit passes around the band-pulley $i^{10}$ of the operating-shaft for the buffing-band $i$ and in the lower portion of its circuit passes around the band-pulley $j^{10}$ of the operating-shaft for the buffing-band $j$. For the purpose of actuating the said driving-band $i^{14}$ a secondary shaft $i^{15}$ is mounted in bearings $i^{16}$ at the rear of the machine-frame, the said shaft being driven from the driving-shaft $b$, as by means of a band $i^{17}$, Figs. 17 and 33, passing around driving-pulleys $i^{18}$ and $i^{19}$ on the secondary shaft $i^{15}$ and driving-shaft $b$, respectively. Upon the shaft $i^{15}$ are mounted a pair of pulleys $i^{20}$ $i^{21}$ for each half or section of the machine, Fig. 33, the two portions of the driving-band $i^{14}$ passing over and partly around the said pulleys in going to and returning from the band-pulleys $i^{10}$ $j^{10}$. One of the said pulleys on shaft $i^{15}$—as, for instance, that designated $i^{20}$—is fast upon the shaft $i^{15}$ and drives the band $i^{14}$ by its frictional contact with the latter. The other of the said pulleys, as $i^{21}$, is loose upon the said shaft and serves simply as an idler or guide pulley. Idler-pulleys $i^{22}$ $i^{22}$, beneath which the band $i^{14}$ passes, are mounted upon a shaft $i^{23}$ adjacent the point of pivotal support of the carrier-frame $i^5$ for the buffing-band $i$.

The buffing-band-carrier frames $i^5$ $j^5$ are caused to tend toward the path in which the shoe travels, so as to cause the buffing-bands to make contact with the bottom of the shank and sole of the shoe by a yielding force suitably produced. In the present instance the said carrier-frames are mounted so that they gravitate toward the said path, as indicated by Figs. 1, 2, and 17, the action of gravity being aided by the springs $m^2$ $m^2$, which hold the actuating arms or levers $m'$ $m'$, presently to be described, in engagement with the cam by which the carrier-frames are moved outward to retract the buffing-bands, so as to clear the heel of the shoe.

The means by which when the rearmost portion of the shank of a shoe has been acted upon by one of the buffing-bands outward movement of the carrier-frame for the said buffing-band is occasioned in order to withdraw the buffing-band from its operative position before it has been encountered by the forward end or breast of the heel and by which the carrier-frame is held outward until the toe portion of the sole of the next succeeding shoe upon the work-carrier has been presented by the advance of the work-carrier in position to receive the buffing-band is shown in Figs. 1, 2, and 17 to 30. It comprises the cam last referred to, such cam rotating in proper timing with respect to the work-carrier and operating connections between the said cam and the carrier-frame. The operating connections comprise the connecting-link $m$ and actuating-lever $m'$, Figs. 1, 2, and 17, the said connecting-link having one extremity thereof joined to the said actuating-lever and the said actuating-lever having a roll or projection which makes contact with the cam. The cam is fast upon the shaft $h$ of the work-carrier. It is double, as shown, to suit the number of jacks, one circumferential half of the cam acting to move the buffing-bands $i\,j$ successively outward as one shoe passes the same and then the other half of the cam repeating the operation as the next shoe passes the said buffing-bands. In order to provide for the differences which occur in the lengths of shoes, the cam is made adjustable, each half thereof having a fixed portion and an adjustable portion. Thus the cam is formed of a part or member $n$, (shown separately in Figs. 25 and 26 of Sheet 7,) which is relatively fixed with respect to the shaft and parts or members $n'\;n'$, each of which is adjustable with relation to the said part or member $n$ angularly about the shaft $h$. The purpose of the said adjustability is to enable the circumferential length of the opposite-acting portions of the cam to be varied to suit differences in the length of the interval between the breast of the heel of one shoe upon the work-carrier and the toe portion of the sole of the next succeeding shoe. The fixed part or member $n$ of the cam is formed with a hub $n^2$, upon which the eye or boss $n^3$ of each of the adjustable parts or members $n'\;n'$ is fitted with capacity to turn around the said hub. Each of the said adjustable parts or members is held in the desired position by means of a clamping-screw $n^4$, Figs. 2, 23, and 24, the stem of which passes through a segmental slot $n^5$, which is formed in the adjustable part or member $n'$, into a threaded hole $n^6$, which is tapped in the fixed part or member $n$, the said adjustable part or member being clamped between the enlarged head of the screw and the said fixed member.

The heel-buffing rolls or cylinders $k\;l$, together with the supporting and actuating devices therefor, the setting devices for the said rolls or cylinders, and the devices by which the rolls or cylinders are gradually shifted outward to cause them to conform in their action upon the wear-surface of a heel to the outward inclination of the said wear-surface are represented in Figs. 1 and 2 and in Figs. 31, 32, and 33 of Sheets 8, 9, and 10. For the support of the roll or cylinder $k$ it is mounted to turn around a fixed shaft $k'$, which is carried by the outer extremities of arms $k^2\;k^2$, fast upon a supporting rock-shaft $k^3$, which is fitted to bearings in upright portions of the machine-frame. The roll or cylinder $l$ similarly is mounted to turn around a fixed shaft $l'$, which is carried by the outer extremities of arms $l^2\;l^2$, fast upon the supporting rock-shaft $l^3$, which is fixed in bearings in the said upright portions of the machine-frame. The buffing roll or cylinder $k$ is fitted to the exterior of a sleeve $k^{41}$, the latter being fitted upon the fixed shaft $k'$ so as to be free to turn thereon and being provided with a spline $k^{42}$, which compels the roll or cylinder and sleeve to turn together. In like manner the roll or cylinder $l'$ is fitted upon a sleeve $l^4$, having a spline $l^{42}$ and mounted upon shaft $l'$ with freedom to turn thereon. For the purpose of rotating each of the heel-buffing rolls or cylinders a band-pulley $k^4$, Fig. 31, is fixed upon the sleeve $k^{41}$ of the roll or cylinder $k$, and a large band-pulley $k^5$ and a small band-pulley $k^6$, fast with each other, Figs. 31 and 32, are sleeved upon the supporting rock-shaft $k^3$. A driving-band $k^7$ is applied to the band-pulleys $k^4\;k^5$, and a second driving-band $k^8$ is applied to the small band-pulley $k^6$ and a larger band-pulley $k^9$, which is fast upon the driving-shaft $b$. Through the said bands and pulleys driving power is transmitted from the shaft $b$ to the roll or cylinder $k$ to rotate the latter. The roll or cylinder $l$ is rotated in like manner from the driving-shaft $b$ through the agency of a band-pulley $l^4$ upon the sleeve $l^{41}$, a large band-pulley $l^5$ and small band-pulley $l^6$, fast with each other and sleeved upon the rock-shaft $l^3$, a band-pulley $l^9$, fast upon the driving-shaft $b$, a driving-band $l^7$, passing around and connecting the pulleys $l^4\;l^5$, and a driving-band $l^8$, passing around and connecting the pulleys $l^6$ and $l^9$. In order to distribute the wear of the surfaces of the rolls or cylinders $k\;l$ throughout the length of the said rolls or cylinders, provision is made for communicating an endwise movement to each roll during the rotation thereof. Thus each of the rolls $k\;l$ is splined to its sleeve, as already explained, so as to cause it to rotate in unison with the said sleeve, while permitting the roll to move lengthwise along the same, and in order to occasion such lengthwise movement each roll or cylinder is provided at one end thereof with a reduced portion having a circumferential groove, as at $k^{10}$ in the case of the roll $k$ in Fig. 32, the groove being entered by projections on the fork of a traverse-lever $k^{11}$ or $l^{11}$, as the case may be, which is pivotally mounted upon a lug $k^{12}$ or $l^{12}$, projecting from one of the supporting-arms $k^2$ or $l^2$. A pin or roll carried by the said traverse-lever works in the groove of a traverse-cam $k^{13}$ or $l^{13}$, fast upon a sleeve $k^{14}$ or $l^{14}$, that is mounted loosely upon the corresponding rocker-shaft $k^3$ or $l^3$. For the purpose of rotating the cams $k^{13}$ $l^{13}$ the respective sleeves $k^{14}$ $l^{14}$ have fast thereon band-pulleys $k^{15}$ $l^{15}$, respectively, and a band-pulley $h'$ (see also Fig. 2) is fast upon the shaft $h$ of the work-carrier, a driving-band $h^2$ passing around the three band-pulleys $h'$, $k^{15}$, and $l^{15}$ and serving to transmit movement from the band-pulley $h'$ to the traverse-cams $k^{13}$ $l^{13}$ when the work-carrier is rotated.

For the purpose of enabling the swing-frames carrying the rolls or cylinders $k$ and $l$ to be operatively controlled an arm, as $k^{16}$ or $l^{16}$, is mounted upon each of the rock-shafts $k^3$ $l^3$. The arm $k^{16}$ is connected by a rod $k^{17}$ with an arm $k^2$ of the swing-frame carrying the roll or cylinder $k$, so as to maintain the arm and swing-frame in fixed relations with respect to each other, and a similar rod $l^{17}$ connects the arm $l^{16}$ with an arm $l^2$ of the swing-frame supporting the roll or cylinder $l$. To cause the two swing-frames to move in unison, the arms $k^{16}$ $l^{16}$ are joined together by means of a link $l^{19}$. Each of the arms $k^{16}$ $l^{16}$ has connected therewith one extremity of a contracting spiral spring $k^{18}$ or $l^{18}$, the other extremity of such spring being connected to a fixed part of the machine-framing and the said springs acting with a tendency to move or turn the swing-frames in the direction to move the rolls $k$ $l$ toward the work-carrier. In practice one of the said springs may be omitted, if desired, although by the use of two springs each of the same may be made more delicate in its action. In order to guard against the possibility of undue movement of the swing-frames and rolls or cylinders $k$ $l$ toward the work-carrier under the influence of the spring or springs, a stop $k^{19}$, Figs. 1 and 31, is mounted upon a fixed part of the machine-framing in the path of the arm $k^{16}$. To enable the angular relationship between the arms $k^{16}$ $l^{16}$ and the respective swing-frames to be varied, as for the purpose of varying the degree of pressure of the rolls or cylinders and the action of the said rolls or cylinders upon the wear-surface of the top lift of a heel passing the rolls or cylinders, provision is made for adjusting the rods $k^{17}$ $l^{17}$ in the direction of their length with respect to the arms $k^{16}$ $l^{16}$. To this end the rods $k^{17}$ $l^{17}$ are connected with the arms $k^{16}$ $l^{16}$ by passing them through swivels $k^{20}$ $l^{20}$, Fig. 32, which are mounted upon the said arms, nuts $k^{21}$ $l^{21}$ being applied to the respective rods at opposite ends of the respective swivels and the rods being adjusted lengthwise through the swivels by turning the said nuts. These devices also enable independent adjustment of the respective rolls or cylinders to be effected.

In the working of the machine the swing-frames automatically are moved outward with relation to the work-carrier against the tension of the springs $k^{18}$ $l^{18}$ in setting the buffing rolls or cylinders to suit the height of the heel which is next to be operated upon thereby and in gradually shifting the same to conform to the inclination of the wear-surface of the top lift as the heel passes each of the rolls or cylinders.

For the purpose of enabling this movement to be communicated to the swing-frame at the proper times the arm $k^{16}$ is joined by a link $t^4$ to an arm $t^3$, projecting rearwardly from a sleeve $t^2$, Fig. 32, the latter being mounted upon a fixed shaft $t^\times$, that is supported by the upright portions of the machine-framing. When the sleeve is rocked upon its supporting-shaft $t^\times$, movement is transmitted to the swing-frames through the connections described. For use in rocking the sleeve the latter has loosely fitted upon the same at one side of the hub or collar of the arm $t^3$ the hub or collar of an operating-arm $u$, Figs. 1, 2, 31, and 32. The said operating-arm projects forward and is joined by a connection $u'$ to a radius-arm $u^2$, which latter is pivoted at $u^3$ to a small stand projecting from one of the upright portions of the machine-framing. To enable the radius-arm $u^2$ to be operated at the proper times, the said arm carries a roll $u^4$, Figs. 2 and 32, for engagement with the setting-cams $u^5$ $u^5$ and templet-cams $u^6$ $u^6$, respectively, Figs. 1, 2, and 31, which are mounted upon the disk $u^7$, fast upon the work-carrier shaft $h$. Movement communicated to radius-arm $u^2$ in consequence of the action of the said cams against roll $u^4$ is transmitted through the link $u'$ to the operating-arm $u$. At the time at which such action occurs the operating-arm $u$ is locked or clutched to the sleeve $t^2$. In order to effect the locking or clutching, the hub or collar of the operating-arm $u$ is formed or provided with a conical flange or shell $u^8$, constituting one member of a clutch, and a second clutch member $u^9$, having an exterior cone to fit within the said flange or shell, is splined upon the sleeve $t^2$, so that it is free to move lengthwise upon the latter, while the said clutch member $u^9$ and sleeve are compelled to turn in unison. A cam-collar $v$, Figs. 2 and 32, mounted loosely upon the sleeve at the outer side of clutch member $u^9$, is provided on its outer side with a lateral cam-face engaging with a corresponding reversed cam-face which is formed on the fixed collar or hub $v'$, Fig. 32. In one position of the cam-collar $v$—namely, that occupied in Figs. 2, 31, and 32—it holds the clutch member $u^9$ toward the left in Fig. 2, (the right in Fig. 32,) with the exterior of the said clutch member pressed tightly against the interior of the flange or shell $u^8$. The latter is backed up by the hub or collar of arm $t$. Consequently through the engagement of the two clutch members the operating-arm $u$ is clutched or locked to the sleeve $t^2$, so that movement communicated to the operating-arm as a result of the engagement of either a setting-cam or a templet-cam with the roll $u^4$ is imparted to the said sleeve to be transmitted through arm $t^3$ to the swing-frames carrying the buffing rolls or cylinders. In another position of the cam-collar the pressure by which the clutch members are caused to engage with each other is relaxed, and the sleeve and its connections are left free to be turned reversely under the influence of the tension of the springs $k^{18}$ $l^{18}$. The cam-collar is operated to cause it to assume the two positions aforesaid alternately by means of a forked arm $v^2$, projecting therefrom, Figs. 1 and 31, the slot of the said arm being entered by one arm of a rocker $v^3$, which is mounted pivotally at $v^4$ upon one of the upright portions of the machine-framing. The long arm of the said rocker is joined by a connection $v^5$ to a radius-arm $v^6$, which is pivoted upon the said upright portion of the machine-framing. A roll carried by the radius-arm $v^6$ bears against the periphery of a cam-disk $v^7$, which is fast upon the work-carrier shaft $h$. Through the action of the raised portions of the periphery of the cam-disk $v^7$ the clutch is held closed normally, keeping the operating-arm $u$ in operative relations with the sleeve $t^2$; but by means of notches or depressions $v^8 v^8$, which are formed in the periphery of the cam-disk at diametrically opposite points, the said clutch is allowed to open for a brief interval twice in each rotation of the work-carrier, thereby disconnecting the operating arm and sleeve from each other.

The setting-cams $u^5$ and templet-cams $u^6$ correspond in form. Each thereof is formed with a groove, into the leading end of which the roll $u^4$, carried by the radius-arm $u^2$, enters as the cam approaches such roll in the turning movement of the cam-disk $u^7$, and each thereof is formed with an ascending grade acting upon the said roll to move the latter outward and upward in the present instance, occasioning thereby outward movement of the respective heel-buffing rolls or cylinders $k$ $l$. In the present instance the setting and templet cams are disposed in groups upon the cam-disk $u^7$, each of such groups comprising two templet-cams and a setting-cam. The first templet-cam of each group is timed to act as the heel of a shoe is presented to the operation of the first buffing roll or cylinder $k$, and in consequence of gradually pressing outward the roll aforesaid it operates to occasion a gradual outward shift of the buffing rolls or cylinders, thereby causing the roll or cylinder $k$ to conform to the outward inclination of the wear-surface of the top lift of the said heel while the latter is being carried past the same. After the heel has been carried by the rotation of the work-carrier beyond the buffing roll or cylinder $k$ the first templet-cam permits the swing-frames to be turned by their springs $k^{18}$ $l^{18}$ so as to shift the buffing rolls or cylinders $k$ $l$ inward into their normal positions again. As the breast end of the heel reaches the second buffing roll or cylinder $l$ the roll $u^4$ enters the leading end of the second templet-cam $u^6$ of the group, as shown by Figs. 1 and 31, and the operation by which the heel-buffing rolls or cylinders are gradually shifted outward to cause the second roll or cylinder $l$ to conform to the incline of the wear-surface of the heel is repeated. The heel of this shoe having been carried past the second buffing roll or cylinder $l$, the operation of setting the heel-buffing devices in readiness for operating upon the heel of the next succeeding shoe is performed prior to the arrival of the latter heel at the first heel-buffing roll or cylinder $k$. To this end a setting-cam $u^5$ and a gage or measuring device $t$ are brought into operation during the interval. The said gage or measuring device is constituted by a roll which is mounted upon an arm $t'$, fast upon sleeve $t^2$ and projecting forward therefrom. It may occupy a position at any convenient point in the machine, enabling the wear-surface of the top lift of the heel of a shoe mounted upon the work-carrier to make contact with the same in advance of the arrival of the said heel at the first heel-buffing roll or cylinder. In the present machine the gage or measuring device is located intermediate the first and second buffing-bands $i$ and $j$. By the continued rotation of the work-carrier the setting-cam $u^5$, pertaining to the group aforesaid, is caused to act upon the roll $u^4$, it being capable of occasioning, through the connections described, an outward movement of the operating-arm $u$ and also of the heel-buffing rolls or cylinders similar to that which is produced by the action of the templet-cams $u^6$ $u^6$. As the roll $u^4$ travels within the groove of the setting-cam the heel which is next to be buffed passes into position to cooperate with the gage or measuring device (roll) $t$. Also one of the notches $v^8$ of cam-disk $v^7$ is presented to the roll that is mounted upon arm $v^6$. By the entrance of the latter roll into the said notch the rocker $v^2$ is caused to turn the cam-collar $v$ so as to unclutch arm $u$ from sleeve $t^2$, freeing the sleeve $t^2$ and its connections to the control of springs $k^{18}$ $l^{18}$ and permitting the said sleeve and connections to assume positions determined by the contact of the gage $t$ with the wear-surface of the top lift of the heel. In other words, the positions of the heel-buffing rolls or cylinders at this time will be determined by that which the gage $t$ assumes when making contact with the wear-surface of the top lift of the heel about to be buffed. As the heel passes the gage-roll $t$ its wear-surface presses the latter outward, the rolls or cylinders $k\ l$ being correspondingly moved through the connections of said gage and rolls or cylinders with the sleeve $t^2$, this action progressing simultaneously with the outward movement of the operating-arm $u$ that is occasioned by the action of the ascending grade of the setting-cam $u^5$ upon the roll $u^4$, mounted upon the radius-arm $u^2$. The conjoint action progresses until the roll $u^4$ arrives at the highest point of the said ascending grade and the gage-roll $t$ reaches the rounded rear end of the heel, at which moment the cam-surface at the rear side of the notch $v^8$ in the cam-disk $v^7$ acts to raise the arm $v^6$, thus operating the rocker $v^2$ to clutch the arm $u$ to the sleeve $t^2$ again. Thereby the heel-buffing devices are set to suit the height of the heel which has just passed the gage-roll. By the succeeding raised peripheral portion of the cam-disk $v^7$ the said arm is caused to remain locked in fixed relations to the sleeve $t^2$ until after the heel has passed the two rolls $k$ and $l$. As it thus passes the succeeding templet-cams $u^6\ u^6$ act successively to produce the outward shift of the rolls $k\ l$ as the heel passes each roll or cylinder. It will be perceived that inasmuch as the templet-cams and setting-cams correspond in their action upon roll $u^4$ each of the said succeeding templet-cams $u^6\ u^6$ will in turn transmit to the heel-buffing rolls or cylinders $k\ l$ as the heel passes it the same movement that was communicated to the said rolls or cylinders by the action of the said heel against the gage $t$.

What is claimed as the invention is—

1. A machine for finishing the bottoms of shoes, comprising, essentially, a sole-bottom-finishing surface, a separate heel-bottom-finishing surface, and a moving carrier by which the said shoe is fed to the action of the said surfaces in succession.

2. A machine for finishing the bottoms of shoes, comprising, essentially, a sole-bottom-finishing surface, a separate heel-bottom-finishing surface, a moving carrier by which a shoe is fed to the action of the said surfaces in succession, and means operating to occasion relative shift of the sole-bottom-finishing surface and shoe with respect to each other to cause the said surface and the heel of said shoe to clear each other until the latter passes the former.

3. A machine for finishing the bottoms of shoes, comprising, essentially, a plurality of sole-finishing devices, a plurality of heel-bottom-finishing devices, and a moving carrier by which a shoe is fed to the finishing devices in succession to be acted upon by each of the latter in turn.

4. A machine for finishing the bottoms of shoes, comprising, essentially, a moving carrier for a shoe, a buffing-band operating upon the sole and shank of said shoe, and a buffing roll or cylinder operating upon the wear-surface of the top lift of the heel of the shoe.

5. A machine for finishing the bottoms of shoes, comprising, essentially, a moving carrier for a shoe, a plurality of buffing-bands of different characters operating successively upon the sole and shank of the shoe, and a plurality of buffing rolls or cylinders of different characters acting successively upon the heel-bottom.

6. A machine for finishing the bottoms of shoes, provided with a moving carrier for a shoe, a device for finishing the bottom of the sole and shank of a shoe fed by the said carrier, and devices occasioning a relative shift of the said shoe and finishing device to enable the latter and the heel of the shoe to pass each other, and also a temporary dwell or suspension in the advance of the shoe while the shift is taking place.

7. In combination, a moving carrier for a shoe, a bottom-finishing device, a shoe-support connected with the said carrier, and means occasioning a rearward and inward shift of the said shoe-support to cause the path of the heel of the shoe carried thereby to shift so as to clear the finishing device, and also produce a temporary dwell or suspension in the advance of the shoe while the shift is taking place.

8. In combination, a bottom-finishing device, a moving carrier, a shoe-support mounted on said carrier, and devices occasioning a rearward and inward movement of said shoe-support and simultaneous outward movement of said bottom-finishing device to cause the said device and the breast of the shoe-heel to clear each other.

9. In combination, a swinging buffing-frame, a rotating shaft journaled in said buffing-frame, an operating-pulley on said shaft, yielding tension-pulleys at opposite sides of said operating-pulley, a buffing-band supported by said pulleys and driven by the operating-pulley, a movable carrier for a shoe, and means to swing said buffing-frame to remove the buffing-band from the path of the breast of the heel of said shoe.

10. In combination, a movable buffing-frame, a rotating shaft journaled in said buffing-frame, an operating-pulley on said shaft, yielding tension-pulleys at opposite sides of said operating-pulley, a buffing-band extended around said pulleys and driven by said operating-pulley, a movable carrier for a shoe, and a cam in operative connection with said buffing-frame operating to move the latter to cause the buffing-band to clear the heel-breast.

11. In combination, a sole-bottom-finishing device, a support therefor, a moving carrier receiving a plurality of shoes, and a cam in operative connection with the said support, actuating the same to withdraw the said device to clear the heel of one shoe and place it in working relations with the forward end of the sole of the next shoe, and adjustable to suit different distances between shoes.

12. In a machine for finishing the bottoms of shoes, in combination, the buffing-band, operating and guide pulleys for said buffing-band, a movable support for said pulleys, a moving carrier receiving a plurality of shoes, and a cam in operative connection with the said support, actuating the same to withdraw the buffing-band to clear the heel-breast of one shoe and place it in working relations with the forward end of the sole of the next shoe, and adjustable to suit different distances between shoes.

13. In combination, a plurality of sole-bottom-finishing devices, supports therefor, a moving carrier receiving a plurality of shoes, and a cam moving in unison with said carrier, actuating the said supports successively to withrdaw each of the said finishing devices in turn to clear the heel of one shoe and place it upon the forward end of tne sole of the next shoe, and adjustable to suit different distances between shoes.

14. In a machine for finishing the bottoms of shoes, in combination, a plurality of buffing-bands, operating and guide pulleys for each of said buffing-bands, a movable support for the pulleys pertaining to each buffing-band, a moving carrier receiving a plurality of shoes, and a cam in operative connection with the said supports, actuating the same in turn to withdraw the respective buffing-bands to clear the heel of one shoe and place it in working relations with the forward end of the sole of the next shoe, and adjustable to suit different distances between shoes.

15. In a shoe-bottom-finishing machine, the combination with a plurality of swinging buffing-frames each having a rotating shaft journaled therein, an operating-pulley on said shaft, guide-pulleys at opposite sides of said operating-pulley, and a buffing-band extended around the said pulleys and driven by the operating-pulley, of a moving carrier for shoes, and a cam moving in unison with said carrier, actuating the said supports successively to withdraw the said buffing-bands in turn to clear the heel-breast of a shoe passing the said buffing-bands.

16. In a shoe-bottom-finishing machine, the combination with a plurality of swinging buffing-frames each having a rotating shaft journaled therein, an operating-pulley on said shaft, guide-pulleys at opposite sides of said operating-pulley, and a buffing-band extended around said pulleys and driven by the operating-pulley, of a moving carrier for shoes, and a cam moving in unison with said carrier, actuating the said supports successively to withdraw the said buffing-bands in turn to clear the heel-breast of one shoe and place it upon the forward end of the sole of the next shoe, and adjustable to suit different distances between shoes.

17. In a bottom-finishing machine for shoes, in combination, a moving carrier for a shoe, a bottom-finishing device, a movable support for said device, and means independent of the shoe operating to automatically move the said support to cause the finishing device to conform in its action to the inclination of the surface which is being finished with respect to the path of movement of such surface.

18. In combination, a moving carrier for a shoe, a heel-bottom-buffing device past which the heel of said shoe is carried by the movement of the carrier, a support for said buffing device, and means operating to automatically produce relative movement of the heel and buffing device with respect to each other compensating for the inclination of the wear-surface of the heel and causing the buffing device to conform in its action to the said inclination.

19. In a bottom-finishing machine for shoes, in combination, a rotary work-carrier, a heel-bottom-buffing device, a movable support for said buffing device, and means distinct from the buffing device itself operating to automatically move the said support to cause the buffing device to conform in its action to the inclination of the wear-surface of the heel with respect to the path of movement of the said wear-surface.

20. In combination, a moving work-carrier, a heel-bottom-buffing device, a movable support for said device, and means operatively connected with said support and acting to gradually move the latter as the heel-bottom is buffed to cause the buffing device to conform in its action upon the heel-bottom to the inclination of the latter with respect to the path of movement of the same.

21. In combination, a moving work-carrier, a heel-bottom-buffing device, a movable support for said device, and a templet-cam moving with the said work-carrier and operatively controlling the said support whereby the latter gradually moves as the heel-botton is buffed to cause the buffing device to conform in its action upon the heel-bottom to the inclination of the latter.

22. In combination, a rotating work-carrier, a heel-bottom-buffing device, a heel-buffing frame movable radially with respect to the said work-carrier, and a templet-cam moving with the said work-carrier and in operative control of the said heel-buffing frame whereby the latter is caused to gradually move as the heel-bottom is buffed to cause the buffing device to conform in its action upon the heel-bottom to the inclination of the latter.

23. In combination, a moving work-carrier, a heel-bottom-buffing device, a heel-buffing frame supporting the said buffing device, a templet-cam moving with the said work-carrier, and a movable part engaged by the said templet-cam, operated thereby, and operatively connected with the heel-buffing frame.

24. In combination, a moving work-carrier, a plurality of heel-bottom-buffing devices, supports for the said buffing devices, templet-cams moving with the said work-carrier, corresponding in number with the buffing devices, and operatively connected with the said supports, and moving the latter as the heel of a shoe passes each of the buffing devices in turn.

25. In combination, a moving work-carrier, a plurality of swing-frames, heel-bottom-buffing devices respectively mounted in the said frames, and templet-cams moving with the said work-carrier, corresponding in number with the buffing devices, operatively connected with the said swing-frames, and moving the latter as the heel of a shoe passes each of the buffing devices in turn.

26. In combination, a moving work-carrier, a heel-bottom-buffing device, and setting devices for said buffing device, the said setting devices including a gage or measuring device coacting with the bottom of a heel of a shoe on its way to the said buffing device and operating to set the latter to suit the height of said heel prior to the arrival of the heel in position to be operated upon by the buffing device.

27. In combination, a moving work-carrier, a heel-bottom-buffing device, and setting devices operated by the heel of a shoe on its way to the said buffing device to set the latter to suit the height of said heel 28. In combination, a moving work-carrier, a heel-bottom-buffing device, a support for the said buffing device, means operating to automatically produce relative movement of the heel and buffing device with respect to each other compensating for the inclination of the wear-surface of the heel and causing the buffing device to conform in its action to the said inclination, and setting devices operated by the heel on its way to the buffing device to set the latter to suit the height of the heel.

29. In combination, a moving work-carrier, a heel-bottom-buffing device, a support for the said buffing device, means to move the said support as the heel of a shoe passes the said buffing device to cause the latter to conform in its action to the inclination of the heel-bottom, and setting devices operated by the heel on its way to the said buffing device to set the latter to suit the height of said heel.

30. In combination, a moving work-carrier, a heel-bottom-buffing device, a support for the said buffing device, a gage or measuring device in operative connection with the said support and coacting with the heel of a shoe mounted on the work-carrier as the said heel is carried toward the said buffing device, to ascertain the height of the heel, a setting-cam moving with the work-carrier, a templet-cam also moving with the work-carrier, an operating part or member which is engaged by the said cams successively, a clutch by which the operating part or member is operatively connected with the said support for the buffing device, and clutch-operating means whereby the said part or member is unclutched while under the control of the setting-cam and then after the height of the heel has been ascertained clutched with the said support until after having been actuated by the templet-cam.

31. In combination, a sole-buffing device, a rotating work-carrier body, a jack-support movably mounted in connection with the said body, a jack carried by the said support, and a guide controlling the radial position of the jack-support and jack while the sole of a shoe carried by the jack is acted upon by the sole-buffing device, and constructed to occasion inward movement thereof to enable the heel of the shoe to clear the buffing device.

32. In combination, a sole-buffing device, a rotating work-carrier body, a jack-support pivotally connected at its leading end to the said body, a jack carried by the said support at the rear of the pivot, and a guide supporting the jack-support and jack while the sole of a shoe is being operated upon by the buffing device and constructed to permit the jack-support to swing inward to cause the heel of the shoe to clear the buffing device.

33. In combination, a sole-buffing device, a rotating work-carrier body, a jack-support movably mounted in connection with the said body, a jack carried by the said support, a guide controlling the radial position of the jack-support and jack while the sole of a shoe carried by the jack is acted upon by the sole-buffing device, provided with a movable member and a detent therefor, and means to trip the said detent to release the said movable member and permit the jack-support and jack to move inward to enable the heel of a shoe to clear the buffing device.

34. In combination, a buffing device, a rotating work-carrier body, a jack-support mounted in connection with the said body and movable inward and outward with respect to the center of rotation, and means to adjust the jack forward or backward to suit the position of the heel-breast of the shoe that is applied to the said jack.

35. In combination, a buffing device, a rotating work-carrier body, a jack-support mounted in connection with the said body and movable inward and outward with respect to the center of rotation, a jack pivotally mounted upon the said jack-support, and means to adjust the said jack about the pivotal center thereof in the plane of rotation.

36. In combination, a buffing device, a rotating work-carrier body, a jack-support mounted in connection with the said body and movable inward and outward with respect to the center of rotation, means to adjust the jack forward or backward upon the jack-support, and means to adjust the said jack about a pivotal center upon the said jack-support.

37. In combination, a sole-buffing device, a rotating work-carrier body, a jack-support connected with the said body and movable inward and outward with respect to the center of rotation, a stud or roll, means to adjust the jack-support and stud or roll radially with respect to each other, and a grooved guide engaging with the said stud or roll and thereby controlling the radial position of the jack-support and jack while the sole of a shoe carried by the jack is acted upon by the sole-buffing device, and constructed to occasion inward movement of the jack-support and jack to enable the heel of a shoe to clear the buffing device.

In testimony whereof we affix our signatures in presence of two witnesses.

WARREN C. EVANS.
EUGENE H. TAYLOR.

Witnesses to signature of Warren C. Evans:
AMELIA A. SMITH,
WM. H. BELKNAP.

Witnesses to signature of Eugene H. Taylor:
CHAS. F. RANDALL,
EDITH J. ANDERSON